March 7, 1933.  E. R. TAYLOR ET AL  1,900,872
METHOD OF RECOVERING CELLULOSIC DERIVATIVE SCRAP
Filed July 29, 1929
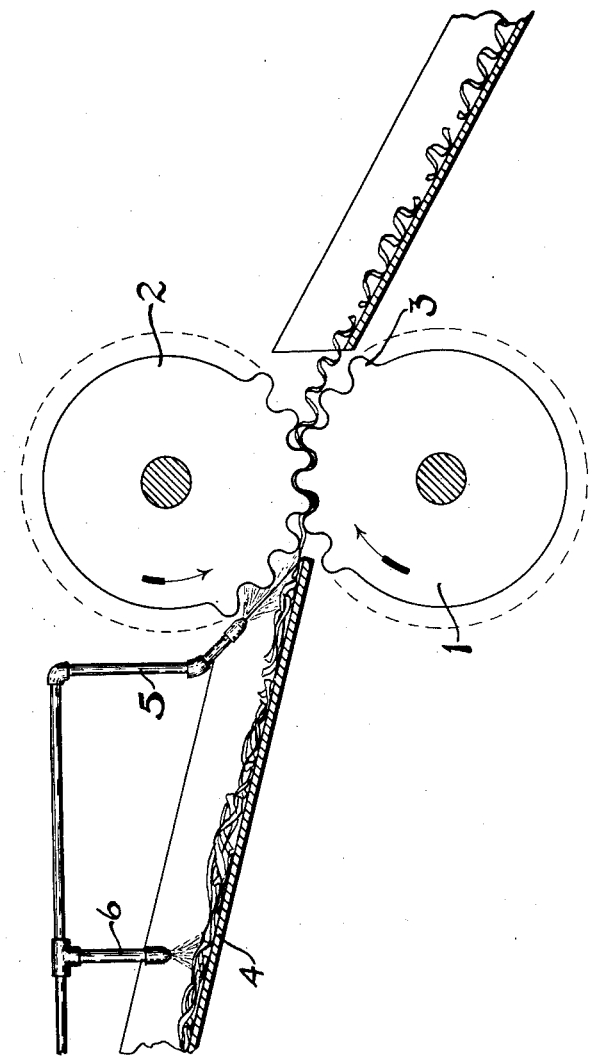
Ernest R. Taylor
Henry B. Smith
Inventors
By Newton M. Perriss
Daniel J. Mayne
Attorney Patented Mar. 7, 1933

1,900,872

UNITED STATES PATENT OFFICE

ERNEST R. TAYLOR AND HENRY B. SMITH, OF ROCHESTER, NEW YORK, ASSIGNORS TO EASTMAN KODAK COMPANY, OF ROCHESTER, NEW YORK, A CORPORATION OF NEW YORK

METHOD OF RECOVERING CELLULOSIC DERIVATIVE SCRAP

Application filed July 29, 1929. Serial No. 381,997.

This invention relates to the utilization of scrap cellulose derivative products, such as photographic film scrap, celluloid sheets and sheets of various cellulose derivatives with or without coatings of various kinds thereon, and more particularly to a method of treating such scrap to facilitate digesting or leaching in the recovery thereof.

In the utilization of film scrap, it is customary to first digest the film scrap in hot water with or without the addition of desirable chemicals to separate and remove the emulsion coating from the film base in order that silver compounds may be recovered from the emulsion and the film base re-utilized in the production of new products. The film scrap so digested may then be treated with a leaching solution such as a solvent or mixture of solvents for the removal of any dyes therein. However, in carrying out these digesting and leaching operations, we have found that the film scrap, whether in long strips or small pieces, will adhere together at the faces thereof and prevent proper access of the digesting or leaching solutions thereto.

We have solved this problem by passing the scrap through corrugating or masticating rolls which corrugate and break up the film scrap, giving to it deformations which prevent the film from adhering together at the faces thereof, thus giving free access of the digesting or leaching solutions to the film scrap. The objects of our invention will be apparent from the foregoing statements and from the following description thereof.

In the single figure of the drawing accompanying this specification and forming a part hereof, we have depicted a diagrammatic sectional view of one form of apparatus for practicing our invention. Rolls 1 and 2 are preferably mounted upon parallel axes and have inter-meshing, corrugating, or other types of masticating teeth 3 upon the peripheries thereof. These rolls are rotated in opposite directions in order that the film may be fed therebetween. The scrap film which is desired to be treated may be fed to the rolls 1 and 2 by means of an inclined trough or conveyor 4 of any suitable or well known type. In order to prevent any fire hazards by the generation of heat due to friction as the scrap passes through the rolls 1 and 2, these rolls may be sprayed by a water spray 5. By applying a water spray 6 to the film scrap as it passes along the conveyor 4 the emulsion of the film will be softened somewhat to make it more susceptible to separation from the film support as the scrap is masticated. As the film scrap passes through the masticating rolls 1 and 2, it is given the approximate shape, in cross section, of the masticating teeth 3 shown upon the drawing and the emulsion is somewhat loosened from the film backing by the differential action of the masticating teeth and by the rupturing of the emulsion surface.

From the foregoing description it will be observed that our method, and the suggested apparatus for carrying it out, are not in the least complicated and are quite effective. The masticating rolls may be of any desired length according to the width of the film scrap which it is desired to pass therethrough. The masticating teeth 3 may be of any desired shape such as the form (in cross section) of a semicircle or of any of the various gear teeth that are known to those skilled in the art, it being merely desirable that the teeth mesh and be spaced sufficiently accurately to perform the function of giving to the film scrap a more or less corrugated shape and to rupture the emulsion coating of the film somewhat so as to permit a better penetration of the digesting or leaching solutions to the emulsion base and/or film base. As these corrugated or masticated pieces of film scrap are placed in a vat of digesting or leaching solution, it will be observed that the pieces of film scrap no longer have plane faces which may adhere together to greatly retard, if not prevent, the proper access of the digesting and leaching solutions to the thus adhering surfaces of the film. The spray of water upon the film scrap softens the emulsion coating sufficiently to facilitate the rupturing of the emulsion coating upon the film to give better access of the digestion solutions later employed.

The moistening of the masticating rolls prevents the accumulation of heat due to friction, thus eliminating any fire hazards which might be involved.

It is obvious that we do not intend our invention to be strictly limited to the disclosure herein presented, as various modifications may be resorted to, as will be obvious to those skilled in the art. For instance, other fluids than water may be found desirable to be sprayed upon the film scrap. Various types of conveyors may be used to conduct the film scrap to the corrugating rolls. All manner of tooth shapes may be employed, and, rather than being longitudinal teeth, the entire length of the roll may be in the form of intermeshing blunt pins of various shapes. The rolls may not be of the same size as such is purely a matter of mechanical design. As mentioned early in this specification we may masticate all kinds of sheet products of cellulosic derivatives by our method and apparatus. For instance plain celluloid, cellulose acetate or cellulose nitrate sheets may be masticated in accordance with our invention to prepare them for treatment with solutions of various kinds.

We claim:

1. The method of utilizing cellulose derivative film scrap which comprises corrugating the scrap and then treating it with a scrap-treating solution.

2. The method of utilizing film scrap which comprises moistening the film scrap, deforming it without comminution, and then treating the film scrap with a scrap-treating solution.

3. The method of utilizing photographic film scrap which comprises moistening the film scrap, corrugating it, and then treating the film scrap with a scrap-treating solution.

4. The process of preparing cellulose derivative film scrap for digesting, leaching or other solution treatment which comprises passing the film scrap between relatively closely spaced corrugating rolls.

5. The process of preparing photographic film scrap for digesting or leaching which comprises moistening the film scrap and then passing the film scrap between relatively closely spaced corrugating rolls.

6. The process of preparing cellulose derivative film scrap for digesting, leaching, or other solution treatment which comprises passing the film scrap between relatively closely spaced masticating rolls.

Signed at Rochester, New York this 24th day of July, 1929.

ERNEST R. TAYLOR.
HENRY B. SMITH.